United States Patent
Repko

(10) Patent No.: US 7,127,366 B2
(45) Date of Patent: Oct. 24, 2006

(54) AUTOMATIC THERMAL CONDUCTIVITY COMPENSATION FOR FLUID FLOW SENSING USING CHEMOMETRICS

(75) Inventor: Mark A. Repko, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/036,343

(22) Filed: Jan. 12, 2005

(65) Prior Publication Data

US 2006/0155496 A1    Jul. 13, 2006

(51) Int. Cl.
    *G01F 1/12* (2006.01)
(52) U.S. Cl. .................................... 702/100
(58) Field of Classification Search ................. 702/45, 702/100
    See application file for complete search history.

(56) References Cited

U.S. PATENT DOCUMENTS

| | | | |
|---|---|---|---|
| 4,965,756 A * | 10/1990 | Pearman et al. ............ | 702/100 |
| 6,474,132 B1 * | 11/2002 | Hathaway et al. ........... | 73/1.27 |
| 6,769,299 B1 * | 8/2004 | Forster et al. ............ | 73/204.26 |
| 2002/0035441 A1 | 3/2002 | Ruesch et al. | |
| 2003/0106380 A1 * | 6/2003 | Bonne et al. ................. | 73/861 |
| 2003/0233860 A1 * | 12/2003 | Deane et al. ................ | 73/1.16 |
| 2004/0030522 A1 | 2/2004 | Tison et al. | |
| 2005/0109100 A1 * | 5/2005 | Eldridge .................. | 73/204.18 |

FOREIGN PATENT DOCUMENTS

EP    1361191 A2    11/2003

* cited by examiner

*Primary Examiner*—Bryan Bui
*Assistant Examiner*—Demetrius Pretlow
(74) *Attorney, Agent, or Firm*—Luis M. Ortiz; Richard H. Krukar

(57) ABSTRACT

An automatically compensated fluid flow sensor uses chemometric analysis to produce a compensated fluid flow measurement. A compensation measurement having at least one additional measurement, such as a measurement of thermal conductivity, electrical conductivity, pressure or density can be used to augment the fluid flow measurement in order to compensate for errors in the fluid flow measurement. A reference fluid flow is required to calibrate the sensor via chemometric analysis.

21 Claims, 4 Drawing Sheets

AUTOMATIC THERMAL CONDUCTIVITY COMPENSATION FOR FLUID FLOW SENSING USING CHEMOMETRICS

TECHNICAL FIELD

Embodiments relate to fluid flow sensing. Embodiments also relate to thermal fluid flow sensors and the use of chemometric analysis to compensate measurement errors.

BACKGROUND OF THE INVENTION

Fluid flow sensors measure the rate at which a fluid flows past the sensor. There are many different types of fluid flow sensors. Ultrasonic flow sensors use a frequency shift caused by the flowing fluid to measure the fluid flow rate. Electromagnetic flow sensors measure fluid flow rate induced frequency shifts of electromagnetic waves such as radio waves, microwaves, or light waves. Thermal fluid flow sensors are based on the heat transfer effects of a flowing fluid. One type of thermal fluid flow sensor is based on measuring the amount of heat energy carried away from a heated element. Another type of thermal fluid flow sensor measures the temperature difference between a temperature sensor upstream of a heated element and the temperature downstream of the heated element. Those practiced in the art of flow sensing are familiar with thermal fluid flow sensors.

Chemometrics is a set of mathematical techniques wherein single measurements or multivariate measurements can be used to produce compensated measurements or to identify a chemical analyte. Software packages for chemometrics are available so that a processor, such as a computer CPU, can use chemometrics. Those practiced in the arts of linear regression, applied chemistry and chemical signature analysis are familiar with chemometrics.

The physical properties of a fluid can cause a fluid flow sensor to produce incorrect readings. For example, a thermal fluid flow sensor depends on the thermal conductivity of the fluid. Two fluids with the same flow rate but different thermal conductivity can yield different flow rate measurements. Other physical properties that can affect fluid flow measurements are electrical conductivity, pressure, and density. Fluid flow sensors should be calibrated in order to produce accurate fluid flow measurements.

Two types of calibration are sometimes used for fluid flow sensors. One type is deployment-based calibration and the other is maintenance-based calibration. In deployment-based calibration, a programmed calibration is chosen based on the where the fluid flow sensor is going to be used. For example, if the fluid is alcohol, then the fluid flow sensor is calibrated for alcohol. In maintenance-based calibration, the output of the fluid flow sensor is exposed to known fluid flow rates and its output is adjusted to match those known fluid flow rates.

The problem with deployment-based calibration is that the calibration is set for a reference fluid that was measured some time in the past. However, the physical properties of the reference fluid in the past can be different from the physical properties of the actual fluid in the present. One reason is that sometimes the reference fluid was not measured under ideal conditions. Another reason is that the actual fluid being measured is rarely flowing under ideal conditions.

The problem with maintenance-based calibration is that the calibration is often performed poorly and that the fluid properties can change. To be useful, the calibration must be performed correctly and regularly by trained, motivated, and properly equipped individuals. Such individuals are often not available. Fluid properties can change because the environment changes or because the fluid itself changes. Environmental changes as minor as the weather or the setting of the sun can cause fluid properties to change. The fluid itself can change intentionally through human intervention or accidentally through contamination.

A fluid flow sensor that can produce accurate measurements regardless of the changing physical properties of the fluid is needed.

The embodiments discussed herein directly addresses the shortcomings of the prior art by utilizing chemometric analysis to compensate for the effects of changes in a fluid's physical properties on fluid flow measurement.

BRIEF SUMMARY OF THE INVENTION

In accordance with an aspect of the embodiments, a flow sensor produces a fluid flow measurement that is then processed by a processor into a compensated fluid flow measurement. The processor reads compensation factors from a storage device and uses chemometrics to produce the compensated measurement.

In accordance with another aspect of the embodiments, a processor uses chemometrics to produce compensation factors from a reference flow measurement, a flow sensor measurement, a compensation measurement, and historical measurements.

In accordance with another aspect of the embodiments, a processor processes a fluid flow measurement produced by a fluid flow sensor, a compensation measurement produced by a compensation module, and compensation factors read from a storage device to produce a compensated fluid flow measurement. The processor utilizes chemometrics to produce the compensated measurement.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the background, brief summary of the invention, and detailed description, serve to explain the principles of the present invention.

DETAILED DESCRIPTION OF THE INVENTION

Figure 1:
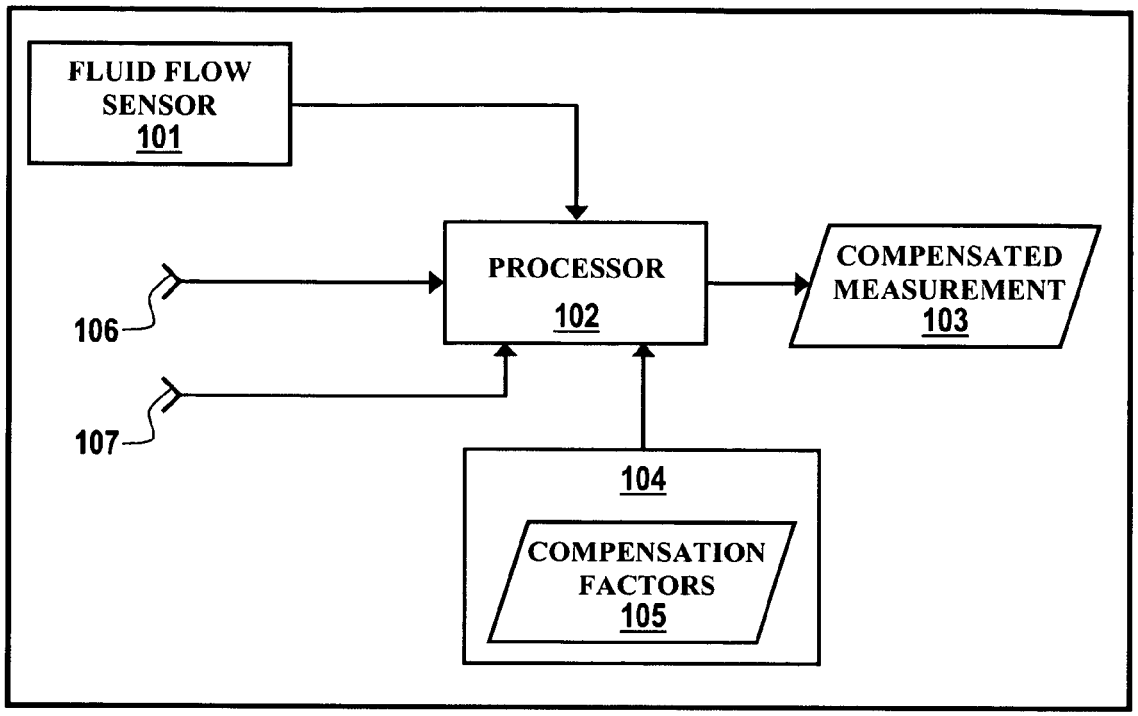
FIG. 1 illustrates an automatically compensated fluid flow sensor, which can be implemented in accordance with a preferred embodiment.

In accordance with one embodiment, FIG. 1 illustrates an automatically compensated fluid flow sensor. A fluid flow measurement can be produced by a fluid flow sensor 101 and passed to a processor 102. The processor 102 utilizes chemometric analysis on the fluid flow measurement and on the compensation factors 105 that are stored in and read from a storage device 104 to produce a compensated measurement 103. The compensation factors 105 are calculated, as discussed later, using chemometric analysis.

FIG. 1 also illustrates a compensation measurement input 106 and a reference flow input 107. A compensation module (not shown) can produce a compensation measurement that is passed to the processor 102 via the compensation measurement input 106. A reference flow measurement can be passed to the processor 102 via the reference flow input 107. One example of a reference flow measurement is a measurement produced by a highly accurate and calibrated flow sensor (not shown). Alternatively, a reference flow present signal can be placed on the reference flow input 107. For example, the reference flow input 107 can normally be set to 0 volts, but can be set to 3.5 volts when the fluid flowing past the fluid flow sensor equals a specific rate.

Figure 2:
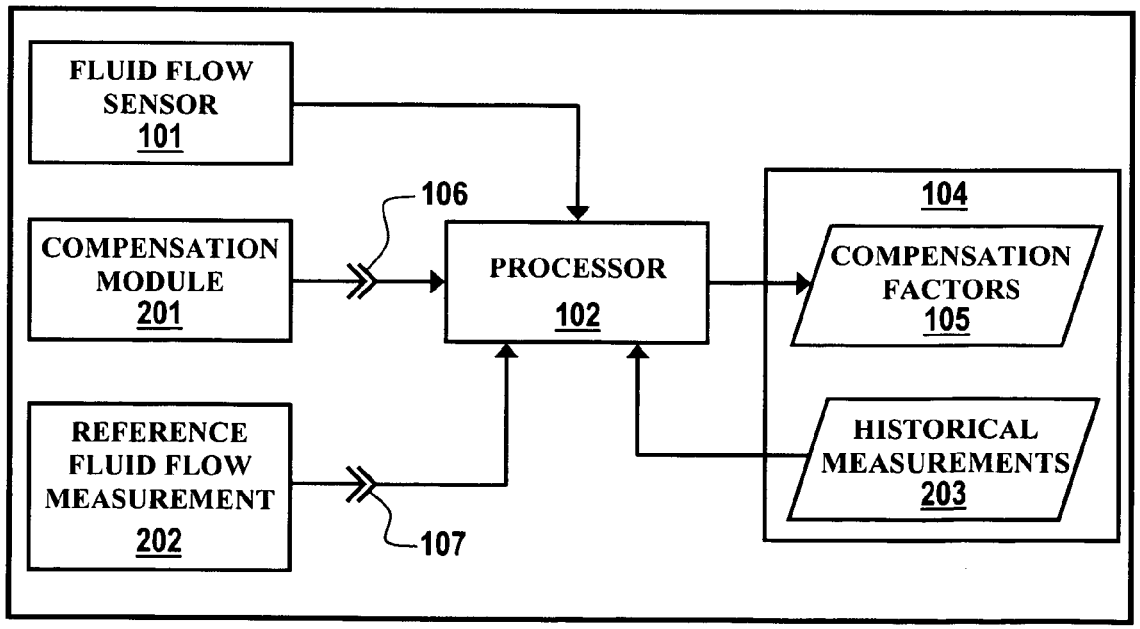
FIG. 2 illustrates an automatically compensated fluid flow sensor in accordance with an alternative embodiment.

In accordance with another embodiment, FIG. 2 illustrates an automatically compensated fluid flow sensor. A fluid flow measurement can be produced by a fluid flow sensor 101 and passed to a processor 102. A compensation measurement is produced by a compensation module 201 and passed to the processor 102. A reference fluid flow measurement 202 can also be passed to the processor 102. Note that a signal indicating a specific fluid flow, as discussed above, can be alternatively passed to the processor 102. The processor also reads historical measurements 203 that are stored in a storage device 104. The historical measurements are historical fluid flow measurements, compensation measurements, and reference fluid flow measurements. The processor 102 uses chemometric analysis to calculate compensation factors 105 and store them in the storage device 104.

As indicated in FIG. 2, a compensation module 201 is shown passing a compensation measurement to the processor 102 via the compensation measurement input 106. The compensation module 201 is used to make measurements that can be used to compensate for errors in the fluid flow measurement. The compensation module 201 can include sensors for thermal conductivity, electrical conductivity, pressure or density. It can include other sensor types as well. The compensation module can include a single sensor, such as a single thermal conductivity sensor, or it can include any combination of sensors.

Figure 3:
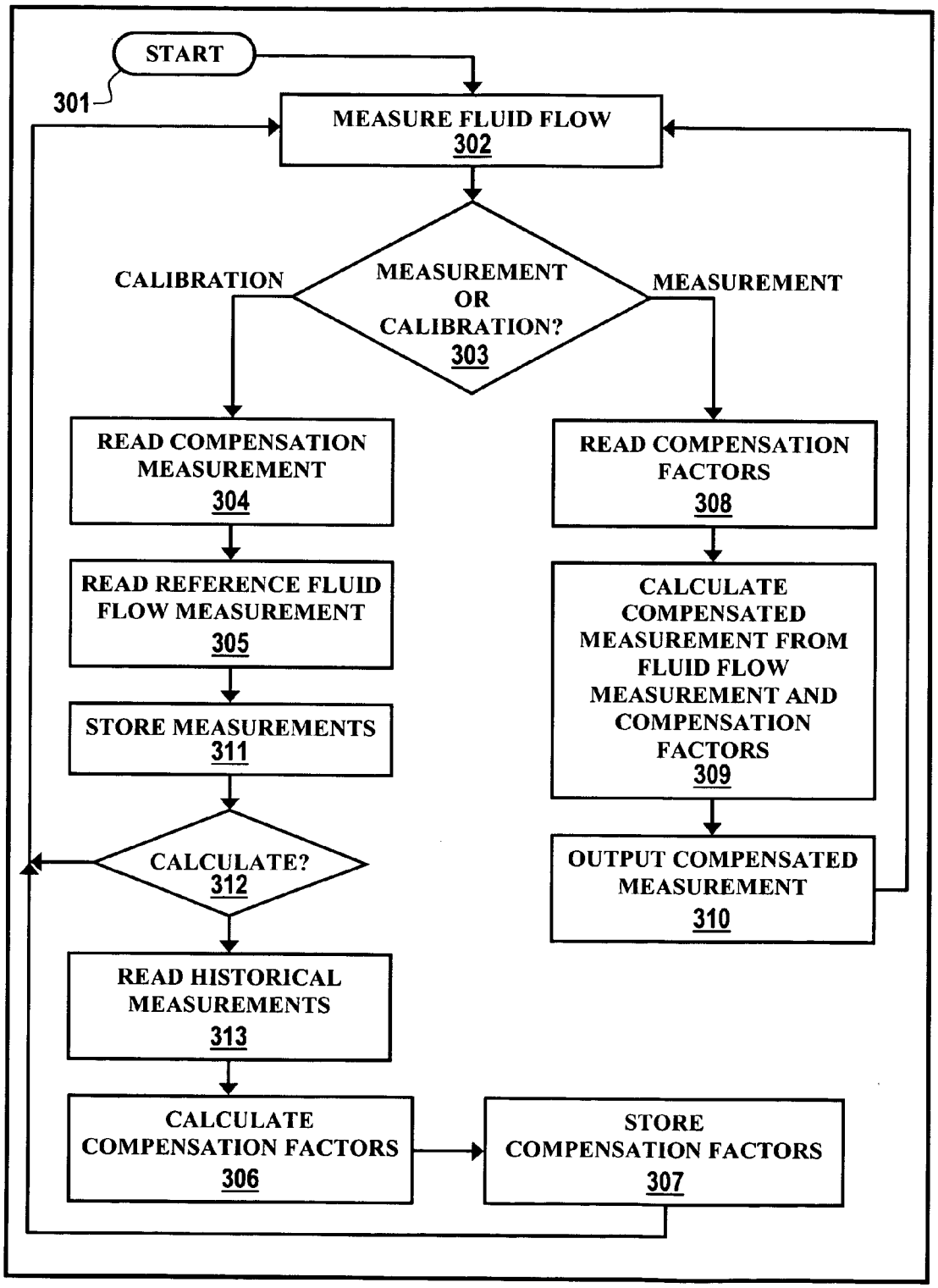
FIG. 3 illustrates a high level flow diagram for a compensated fluid flow sensor in accordance with a preferred embodiment.

In accordance with a preferred embodiment, FIG. 3 illustrates a high level flow diagram for a compensated fluid flow sensor. After the "start" action as indicated at block 301, a flow measurement can be made as depicted at block 302. A decision can be made, as indicated at block 30 as to whether the sensor is in a calibration mode or a measurement mode. If the sensor is in calibration mode, then a compensation measurement can be read as depicted at block 304 and a reference flow measurement can also be read as indicated at block 305 and all the measurements can thereafter be stored as indicated at block 311 with the other historical measurements.

Note that the reference flow measurement can be a previously known value because the fluid flow sensor is always calibrated at a specific fluid flow rate. Next, a decision can be made as indicated at block 312 to calculate the compensation factors. If the answer is "yes", the historical measurements can be read as indicated at block 313. The compensation factors can then be calculated utilizing chemometric analysis as depicted at block 306 and then stored as illustrated at block 307. If in measurement mode, the compensation factors can be read as indicated at block 308 and the compensated fluid flow measurement can then be calculated as indicated at block 309 utilizing chemometric analysis of the fluid flow measurement and compensation factors. Finally the compensated measurement can be output as depicted at block 310. The process repeats by returning to measuring the fluid flow as illustrated at block 302.

Figure 4:
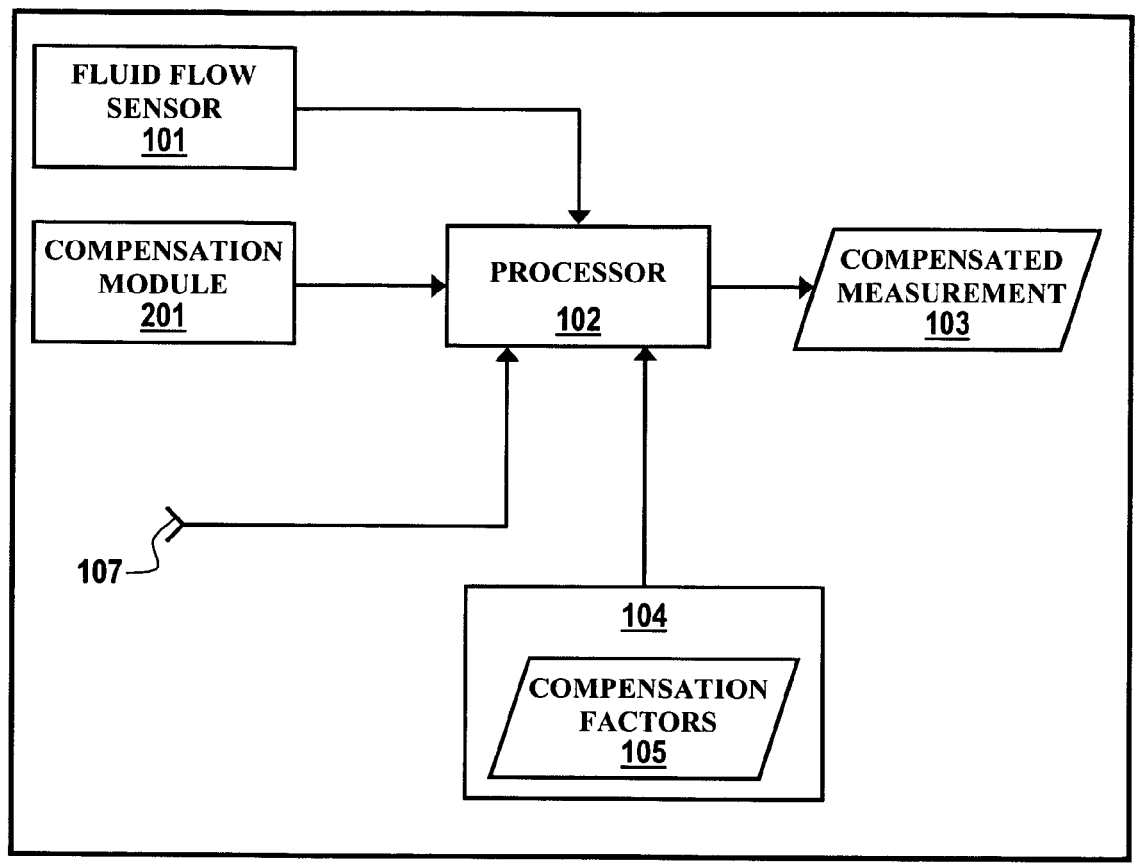
FIG. 4 illustrates an automatically compensated fluid flow sensor in accordance with an alternative embodiment.

In accordance with another embodiment, FIG. 4 illustrates an automatically compensated fluid flow sensor. The difference between FIG. 4 and FIG. 1 is that a compensation module 201 is present and the compensation measurement input 106 is not. The reason is that compensation measurements are always made and passed to the processor whereas in FIG. 1 they were not. The aspects of the embodiment depicted in FIG. 2 also apply to those shown in FIG. 2 with the exception that the compensation measurement input 106 is not present because the compensation module 201 is always present.

Figure 5:
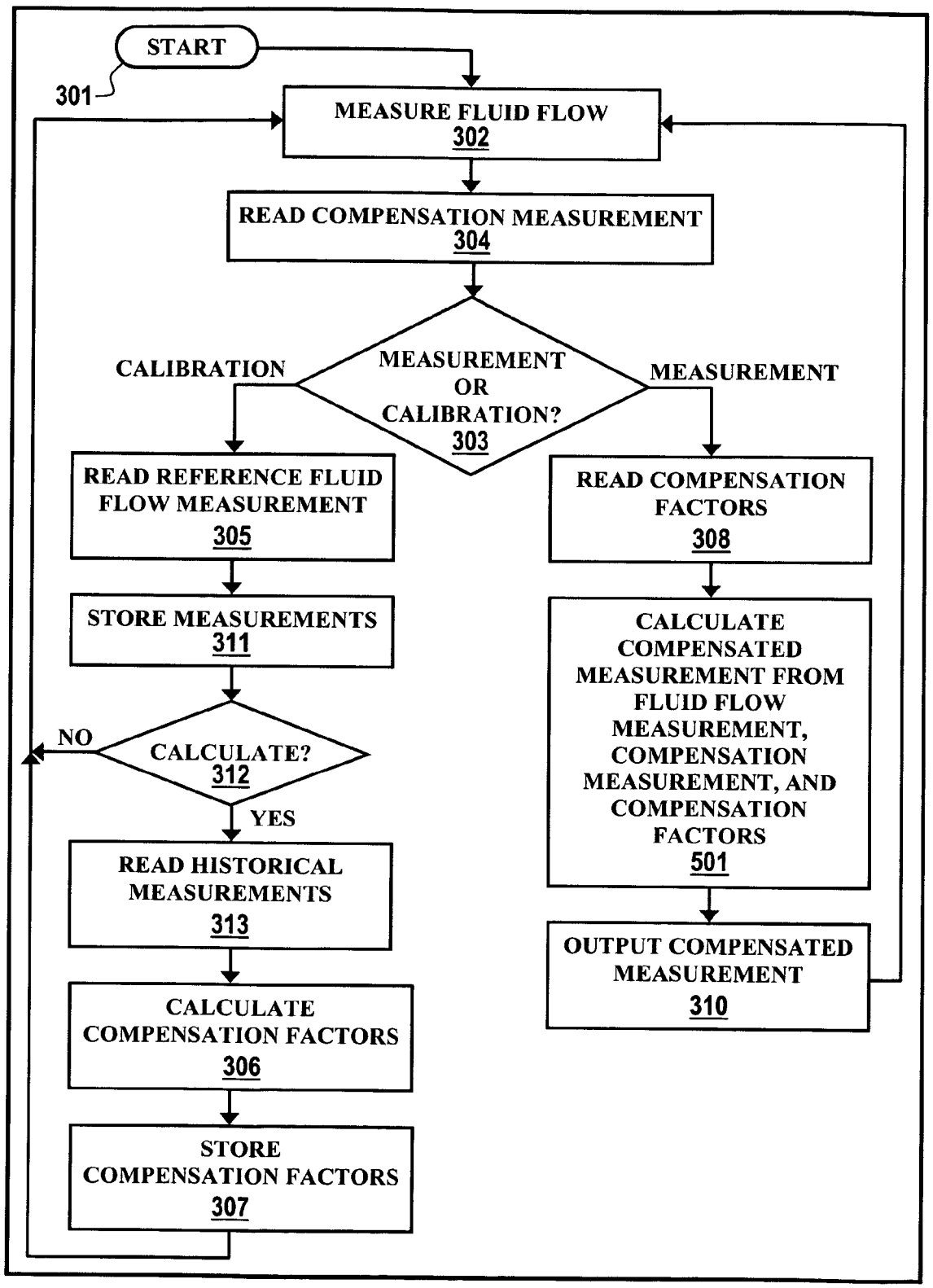
FIG. 5 illustrates a high level flow diagram for a compensated fluid flow sensor in accordance with another embodiment.

In accordance with another embodiment, FIG. 5 illustrates a high level flow diagram for a compensated fluid flow sensor. FIG. 5 corresponds to the aspects of the compensated fluid flow sensor depicted in FIG. 4, whereas FIG. 3 corresponds with the aspects of the compensated fluid flow sensor depicted in FIG. 1. One difference between FIG. 5 and FIG. 3 is that the compensation measurement is read as indicated at block 304 before the decision action is made as depicted at block 303 to calibrate or measure. The only other difference is that the compensated fluid flow measurement is calculated 501 from the compensation measurement as well as the compensation factors and the fluid flow measurement.

It can be appreciated that various other alternatives, modifications, variations, improvements, equivalents, or substantial equivalents of the teachings herein that, for example, are or may be presently unforeseen, unappreciated, or subsequently arrived at by applicants or others are also intended to be encompassed by the claims and amendments thereto.

What is claimed is:

1. An automatically compensated fluid flow sensor comprising:

a fluid flow sensor that produces a flow measurement;

a storage device;

chemometric compensation factors stored in the storage device;

a compensation measurement input adapted for receiving a compensation measurement;

a reference fluid flow measurement input adapted for receiving a reference fluid flow measurement;

the storage device adapted for storage of chemometric compensation factors and historical measurements wherein the historical measurements comprise fluid flow measurements, compensation measurements, and reference fluid flow measurements that were taken In the past; and a processor that uses the chemometric compensation factors and the fluid flow measurement to produce a compensated fluid flow measurement and that, in calibration mode, uses compensation measurements, fluid flow measurements, historical measurements and reference fluid flow measurements to produce chemometric compensation factors that are then stored in the storage device.

2. The automatically compensated fluid flow sensor of claim 1 wherein the fluid flow sensor is a temperature based flow sensor.

3. The automatically compensated fluid flow sensor of claim 2 wherein the compensation measurement comprises a thermal conductivity measurement.

4. The automatically compensated fluid flow sensor of claim 1 wherein the compensation measurement comprises a thermal conductivity measurement.

5. The automatically compensated fluid flow sensor of claim 1 wherein the compensation measurement comprises an electrical conductivity measurement.

6. The automatically compensated fluid flow sensor of claim 1 wherein the compensation measurement comprises a pressure measurement.

7. The automatically compensated fluid flow sensor of claim 1 wherein the compensation measurement comprises a density measurement.

8. An automatically compensated fluid flow sensor comprising:
- a fluid flow sensor that produces a flow measurement;
- a storage device;
- chemometric compensation factors stored in the storage device;
- a compensation module that produces a compensation measurement;
- a reference fluid flow measurement input adapted for receiving a reference fluid flow measurement;
- the storage device adapted for storage of chemometric compensation factors and historical measurements wherein the historical measurements comprise fluid flow measurements, compensation measurements, and reference fluid flow measurements that were taken in the past; and
- a processor that uses the chemometric compensation factors, the compensation measurement and the fluid flow measurement to produce a compensated flow measurement and that, in calibration mode, uses the compensation measurement, fluid flow measurement, historical measurements, and reference fluid flow measurement to produce the chemometric compensation factors that are then stored in the storage device.

9. The automatically compensated fluid flow sensor of claim 8 wherein the fluid flow sensor is a temperature based flow sensor.

10. The automatically compensated fluid flow sensor of claim 9 wherein the compensation measurement comprises a thermal conductivity measurement.

11. The automatically compensated fluid flow sensor of claim 8 wherein the compensation measurement comprises a thermal conductivity measurement.

12. The automatically compensated fluid flow sensor of claim 8 wherein the compensation measurement comprises an electrical conductivity measurement.

13. The automatically compensated fluid flow sensor of claim 8 wherein the compensation measurement comprises a pressure measurement.

14. The automatically compensated fluid flow sensor of claim 8 wherein the compensation measurement comprises a density measurement.

15. A method of automatically compensating fluid flow sensor measurements comprising the steps of:
- using a fluid flow sensor to produce a fluid flow measurement;
- selecting calibration mode;
- using a compensation module to produce a compensation measurement when in calibration mode;
- inputting a reference fluid flow measurement when in calibration mode;
- when in calibration mode, storing the fluid flow measurement, compensation measurement, and reference fluid flow measurement in a storage device as part of a historical measurement record, which is a record of fluid flow measurements, compensation measurements, and reference fluid flow measurements taken in the past;
- when in calibration mode, producing compensation factors by using chemometric analysis on the fluid flow measurement, compensation measurement, reference fluid flow, and historical measurement record; and
- storing the compensation factors in a storage device when in calibration mode.

16. The method of claim 15 further comprising:
- selecting measurement mode after producing the compensation factors wherein the compensation factors are produced in calibration mode by using chemometric analysis;
- reading the compensation factors from the storage device when in measurement mode; and
- producing a compensated measurement by processing data comprising the fluid flow measurement and the compensation factors when in measurement mode.

17. The method of claim 16 wherein the fluid flow sensor is a temperature based fluid flow sensor.

18. The method of claim 15 wherein the fluid flow sensor is a temperature based fluid flow sensor.

19. The method of claim 15 wherein the compensation measurement comprises a thermal conductivity measurement.

20. The method of claim 15 wherein the compensation measurement comprises an electrical conductivity measurement.

21. The method of claim 15 wherein the compensation measurement comprises a pressure measurement.

\* \* \* \* \*